(12) United States Patent
Al-Jamaan (10) Patent No.: US 9,027,464 B1
(45) Date of Patent: May 12, 2015

(54) TWO-PIECE ELECTRIC COFFEE MAKER

(71) Applicant: Mansour A. KH. Al-Jamaan, Rawda (KW)

(72) Inventor: Mansour A. KH. Al-Jamaan, Rawda (KW)

(*) Notice: Subject to any disclaimer, the term of this patent is extended or adjusted under 35 U.S.C. 154(b) by 0 days.

(21) Appl. No.: 14/226,212

(22) Filed: Mar. 26, 2014

(51) Int. Cl.
*A47J 31/44* (2006.01)
*A47J 27/14* (2006.01)
*A47G 19/14* (2006.01)

(52) U.S. Cl.
CPC .................................. *A47G 19/14* (2013.01)

(58) Field of Classification Search
CPC ... A47J 31/20; A47J 27/2105; A47J 31/4439; A47J 27/21083; A47J 27/21175
USPC ......... 99/281, 279, 285, 288, 323.1; 219/432, 219/435, 424–427, 429, 433, 446.1, 448.11, 219/448.12
See application file for complete search history.

(56) References Cited

U.S. PATENT DOCUMENTS

| | | | | |
|---|---|---|---|---|
| 3,184,579 | A * | 5/1965 | Wickenberg | 219/441 |
| 3,280,303 | A * | 10/1966 | Krauss et al. | 219/441 |
| 3,784,788 | A * | 1/1974 | Fourny | 219/441 |
| 3,915,079 | A * | 10/1975 | Balderson | 99/281 |
| 4,401,014 | A * | 8/1983 | McGrail et al. | 99/283 |
| 4,523,083 | A * | 6/1985 | Hamilton | 219/433 |
| 5,842,353 | A | 12/1998 | Kuo-Liang | |
| 5,866,878 | A * | 2/1999 | Lacombe | 219/441 |
| 5,895,595 | A * | 4/1999 | Haden | 219/432 |
| 6,118,102 | A * | 9/2000 | Slegt | 219/438 |
| 6,135,010 | A * | 10/2000 | Husted et al. | 99/319 |
| 6,202,540 | B1 * | 3/2001 | Johnson et al. | 99/285 |
| 6,380,521 | B1 | 4/2002 | Fanzutti | |
| 7,342,329 | B2 * | 3/2008 | Kaastra | 307/126 |
| 7,947,927 | B2 * | 5/2011 | Brooks et al. | 219/432 |
| 2002/0023912 | A1 * | 2/2002 | McGee et al. | 219/432 |
| 2006/0243272 | A1 * | 11/2006 | Chow | 126/373.1 |
| 2008/0274246 | A1 * | 11/2008 | Glucksman et al. | 426/425 |
| 2009/0184102 | A1 * | 7/2009 | Parker et al. | 219/387 |
| 2010/0018403 | A1 * | 1/2010 | Hoare et al. | 99/281 |
| 2011/0072978 | A1 * | 3/2011 | Popescu | 99/288 |
| 2011/0265562 | A1 * | 11/2011 | Li | 73/304 C |
| 2011/0271842 | A1 * | 11/2011 | Garvey | 99/288 |
| 2011/0271872 | A1 * | 11/2011 | Lechthaler | 106/286.4 |
| 2012/0067221 | A1 * | 3/2012 | Krul et al. | 99/289 R |
| 2013/0200064 | A1 * | 8/2013 | Alexander | 219/441 |
| 2013/0220136 | A1 * | 8/2013 | De Jong et al. | 99/285 |

OTHER PUBLICATIONS

AllSourcePro, Alibaba.com, Jan. 19, 2014. _Internet Archive_. http://web.archive.org/web/20140119060419/http://fortunegd.en.alibaba.com/. Retrieved May 13, 2014.*

(Continued)

*Primary Examiner* — Dana Ross
*Assistant Examiner* — Lawrence Samuels
(74) *Attorney, Agent, or Firm* — Richard C Litman (57) ABSTRACT

The two-piece electric coffee maker includes a Dallah (a traditional Arabian coffee pot for making Arabian coffee) and an electric stove. The coffee pot has a temperature sensor that extends from the base of the coffee pot handle into the pot. The base of the handle also has an electrical connector extending downward from the handle. The electric stove has a housing, a ceramic heating element or plate, a display console, and a mating electrical connector facing upward so that the connectors engage each other when the pot is placed on the heating element. An electronic control unit in the stove housing regulates boiling water for the coffee, reducing the heat after the water has started to boil, annunciating an alarm signal when the temperature of the water is suitable to add coffee grounds to the pot, and monitors brewing time for the coffee.

1 Claim, 6 Drawing Sheets

(56) References Cited

OTHER PUBLICATIONS

Product at http://sourcing.alibaba.com/buying-request/details/Arabic-Electric-Kettle-Arabic-coffee-maker-Arab-Jug-235398924.html.*

AllSourcePro, Alibaba.com, Jan. 19, 2014. Internet Archive . http://web.archive.org/web/20140119060419/http://fortunegd.en.alibaba.com/. Retrieved May 13, 2014.*

Product at http://sourcing.alibaba.com/buying-request/details/Arabic-Electric-Kettle-Arabic-coffee-maker-Arab-waterJug/235398924.html.*

* cited by examiner

TWO-PIECE ELECTRIC COFFEE MAKER

BACKGROUND OF THE INVENTION

1. Field of the Invention

The present invention relates to coffee makers, and particularly to a two-piece electric coffee maker having a temperature sensor that assists in monitoring the coffee in the coffee container.

2. Description of the Related Art

Coffee is tremendously popular, and a million cups of coffee are consumed per day. While much has been done to improve the first brewing of coffee, the problem of preserving the flavor of coffee over an extended time after brewing has not been satisfactorily addressed. The most frequent complaints are that the coffee is too hot or too cold, that it develops a "burnt" taste over time, or that desirable flavor notes are lost. The cause of this burnt taste results from overheating or prolonged heating.

In restaurants and cafes, coffee is often brewed into decanters, such as glass coffee pots, which are placed on hot plates to keep the coffee warm. Coffee typically is brewed at a temperature near 200° F./93° C., and kept warm at a temperature near 180° F./82° C. At these high temperatures, coffee breaks down over time and becomes bitter and distasteful to the consumer. Therefore, old coffee is periodically thrown out and replaced with freshly brewed coffee. However, the hectic pace in a restaurant or cafe can cause the wait staff to forget how long a given pot of coffee has been on the hot plate.

As coffee increases in demand and consumption, consumers have also increased demand for fresher, better tasting coffee. One common problem arising in modern coffee machines is the need to signal the user of the staleness or bitterness of the coffee due to overheating or prolonged heating. The longer the time coffee is left warming, the worse the degradation. In addition to the period of time the coffee is warming, the longer the time coffee is brewed at a high temperature, the worse the degradation of the coffee.

When coffee is left warming without a means to monitor, there can be a waste of energy and a waste of coffee product. The waste of coffee product can lead to an increase of coffee supply costs. It is imperative for restaurants, cafes, and home coffee machines to provide quality controls to serve customers and users the best and freshest brewed coffee as much as possible.

Thus, a two-piece electric coffee maker solving the aforementioned problems is desired.

SUMMARY OF THE INVENTION

The two-piece electric coffee maker includes a Dallah (a traditional Arabian coffee pot for making Arabian coffee) and an electric stove. The coffee pot has a temperature sensor that extends from the base of the coffee pot handle into the pot. The base of the handle also has an electrical connector extending downward from the handle. The electric stove has a housing, a ceramic heating element or plate, a display console, and a mating electrical connector facing upward so that the connectors engage each other when the pot is placed on the heating element. An electronic control unit in the stove housing regulates boiling water for the coffee, reducing the heat after the water has started to boil, annunciating an alarm signal when the temperature of the water is suitable to add coffee grounds to the pot, and monitors brewing time for the coffee.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The two-piece electric coffee maker includes a Dallah (a traditional Arabian coffee pot for making Arabian coffee, referred to hereinafter as a coffee pot) and an electric stove. The coffee pot has a temperature sensor (and preferably also a liquid level sensor) that extends from the base of the coffee pot handle into the pot. The base of the handle also has an electrical connector extending downward from the handle. The electric stove has a housing, a ceramic heating element or plate, a display console, and a pedestal next to the heating element, the pedestal having a mating electrical connector facing upward so that the connectors engage each other when the pot is placed on the heating element to permit the transfer of sensor data from the coffee pot to the stove. The stove housing encloses an electronic control unit that when turned on, turns on the heating element to start boiling water for the coffee when the liquid level is high enough, reduce the heat after the water has started to boil, annunciates an alarm signal when the temperature of the water is suitable to add coffee grounds to the pot, monitors brewing time for the coffee, and lowers the temperature of the heating element to a temperature suitable for keeping the coffee warm after brewing.

Figure 1:
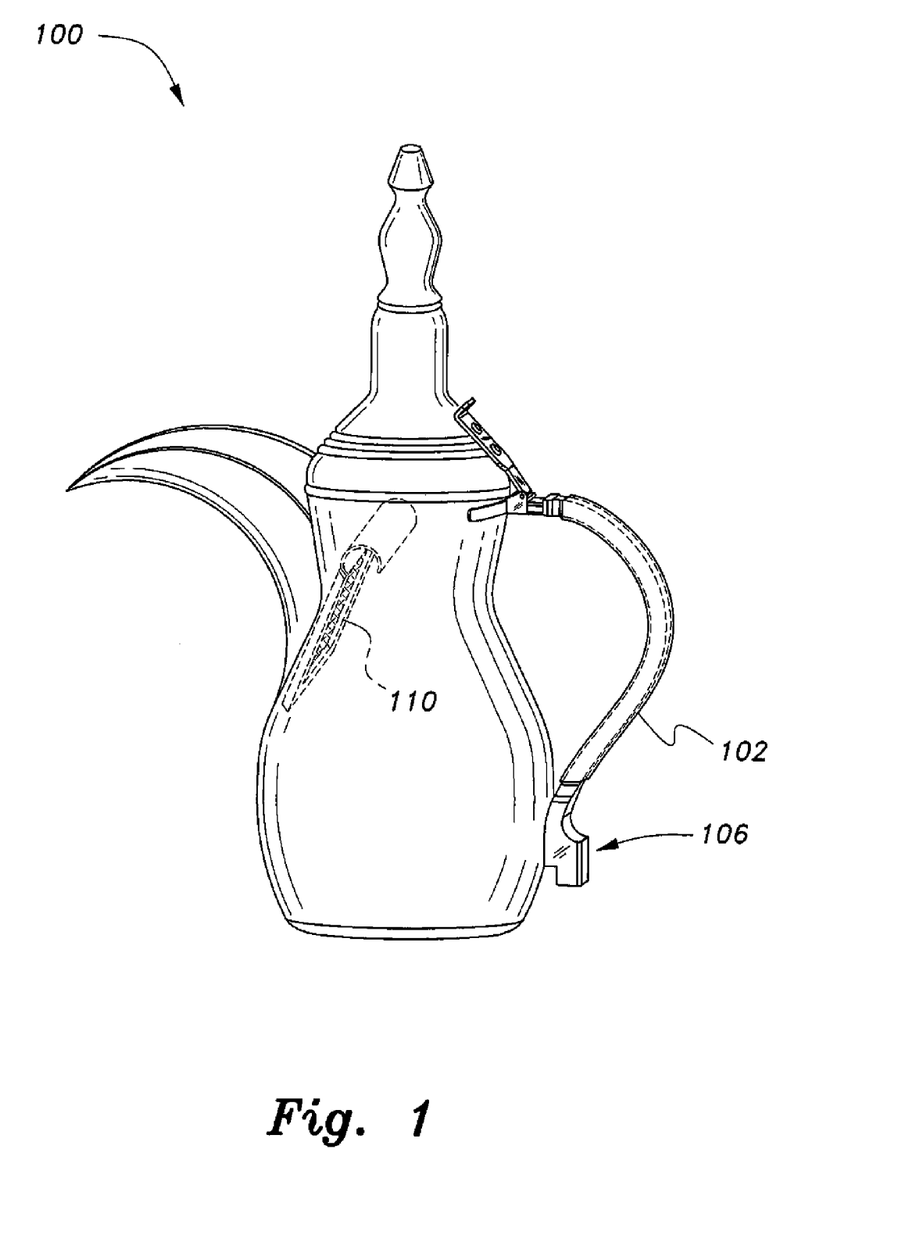
FIG. 1 is a perspective view of the coffee pot component of a two-piece electric coffee maker according to the present invention.

To assist in understanding the various embodiments of a coffee maker in a two-piece coffee maker, reference can be made to FIG. 1. FIG. 1 illustrates a perspective view of the Dallah or coffee pot 100. The coffee pot 100 is preferably made from stainless steel and has an ornate, hinged lid, an elongated spout, a generally semicircular handle 102, and a flat-bottomed round pot. The handle 102 is preferably rubber-coated and has an electrical connector 106 extending downward from the base of the handle 102. The Dallah has a strainer 110 that extends across the mouth of the spout to filter the coffee when it is poured, preventing coffee grounds and other sediment from being poured with the coffee. The strainer 110 may comprise a flat, perforated stainless steel plate slidable in tracks on opposite sides of the mouth of the spout, and having a handle so that the plate can be periodically removed and cleaned.

Figure 2A:
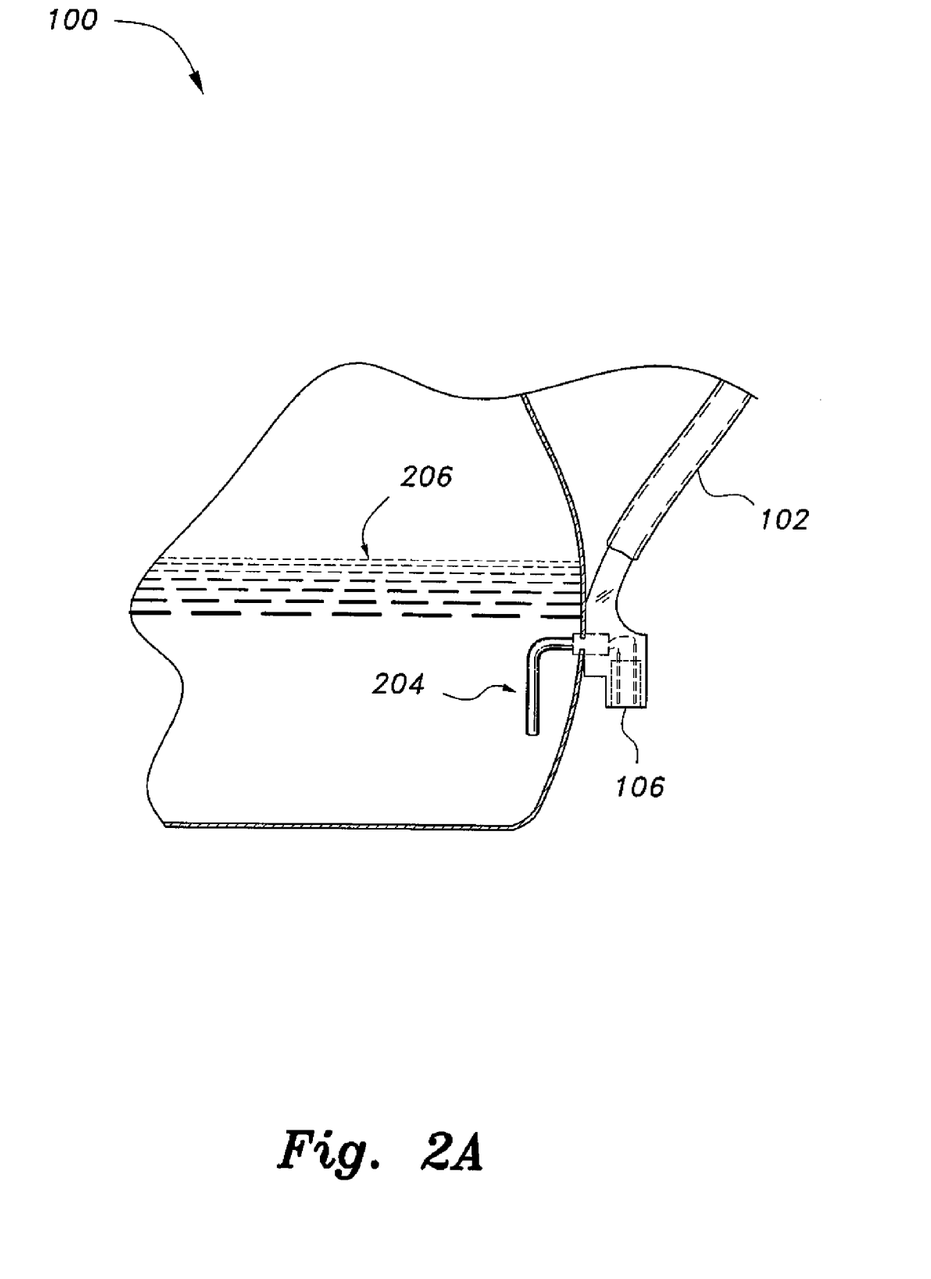
FIG. 2A is a partial side view in section of the coffee pot of FIG. 1.
Figure 2B:
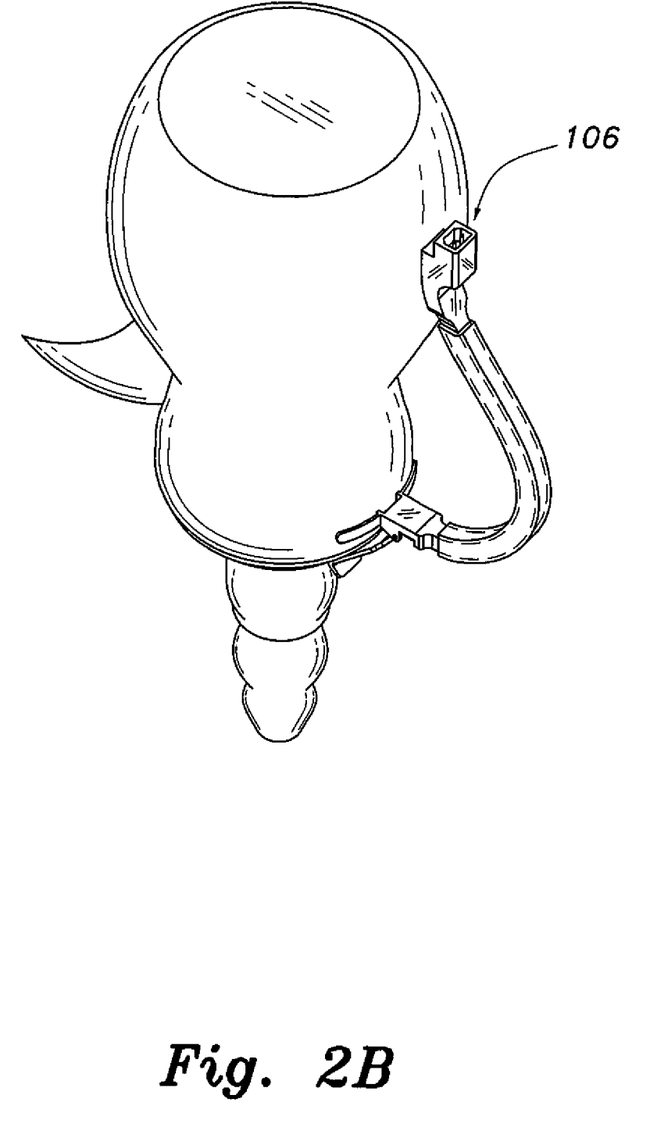
FIG. 2B is another perspective view of the coffee pot of FIG. 1, shown inverted in order to show an electrical connector at the base of the handle.

As shown in FIG. 2A, the coffee pot 100 has at least one sensor 204 that extends from the base of the handle 102 into the pot and may be immersed in water or coffee in the pot 100. The sensor 204 may be an assembly that at least includes a temperature sensor, and that may also include a liquid level sensor for sensing when there is sufficient water in the pot for operation of the heating element. As also shown in FIG. 2B, an electrical connector 106 extends downward from the base of the handle 102, the sensor 204 being electrically connected to the connector.

The temperature sensor can be any type of device capable of detecting the temperature of the liquid 206. The temperature sensor can be a thermocouple, thermistor, or any other temperature detecting sensor commonly understood in the electronic arts.

Figure 3:
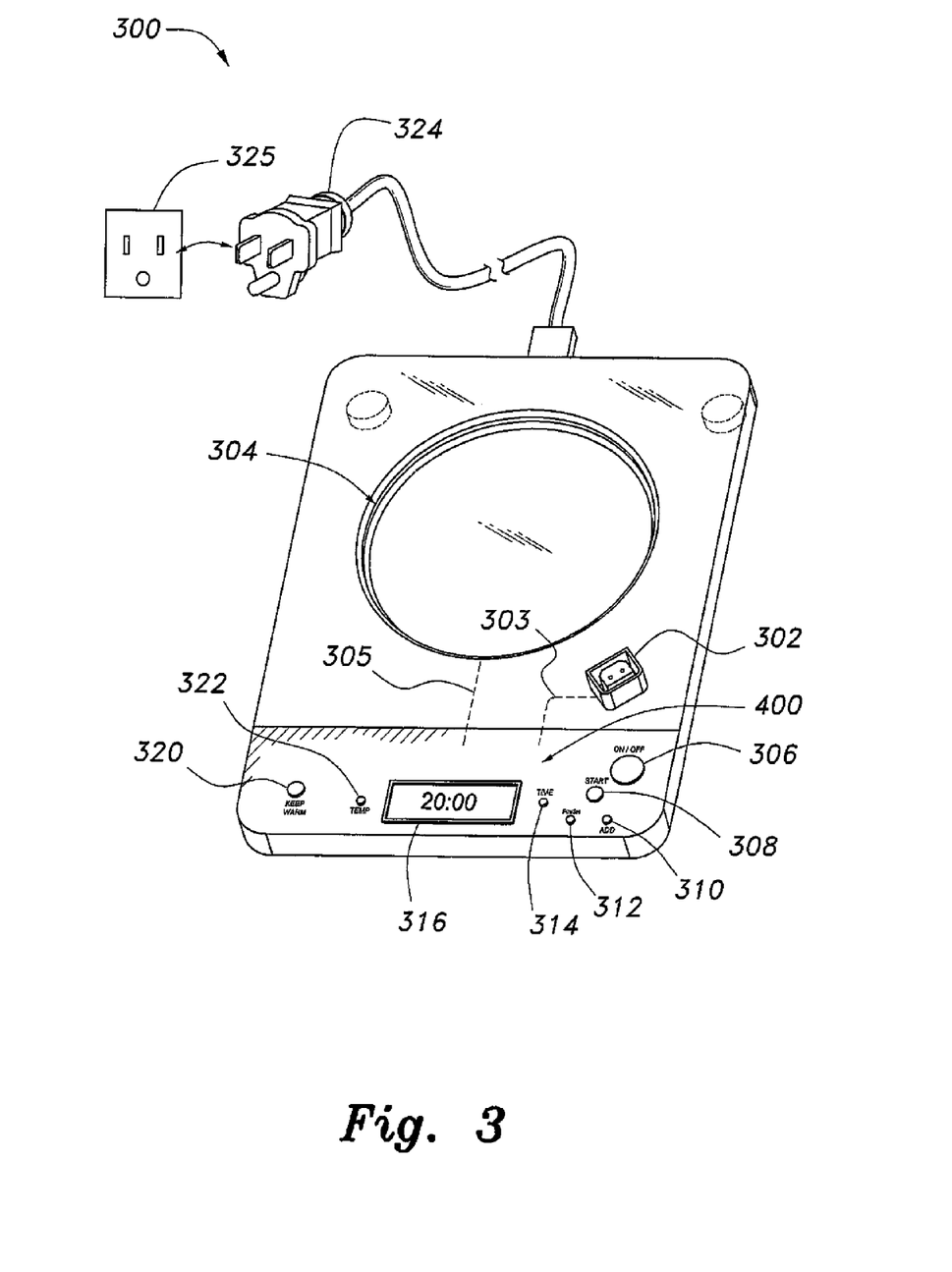
FIG. 3 is a perspective view of the stove base component of a two-piece electric coffee maker according to the present invention.

As shown in FIG. 3, the stove base 300 has a housing with a ceramic heating element or ceramic hot plate 304 mounted therein. An electrical connector 302 is mounted in or on a pedestal extending above the surface of the stove base adjacent the hot plate 304. The electrical connector 302 mates with the electrical connector 106 when the coffee pot 100 is placed on the hot plate 304 with the handle 102 aligned with the pedestal of the electrical connector 302. An electronic control unit 400 is mounted in the housing of the stove base 300 and a console mounted on the base 300 provides a number of interfaces or controls, such as an on/off button 306, a start button 308 to pre-heat or boil water, an LED indicator 310 to add coffee after the water has been pre-heated, an LED indicator 312 that the coffee has finished brewing, an LED indicator 314 to show that the numbers on the digital display 316 represent time, an LED indicator 320 that indicates the stove base is keeping the coffee warm, and an LED indicator 322 that indicates that the numbers on the digital display 316 represent temperature. The electrical connector 302 and the ceramic hot plate 304 are connected to the control unit 400 by internal wiring 303, 305 in the housing.

An electrical plug 324 extends from the housing of the stove base 300 and is adapted for connection to the AC mains through a conventional receptacle or outlet 325. The stove base 300 may be powered by 220-240 VAC at a frequency of 50/60 Hz, but is not limited in this regard, and additional current, voltages, and frequencies can be used.

Figure 4:
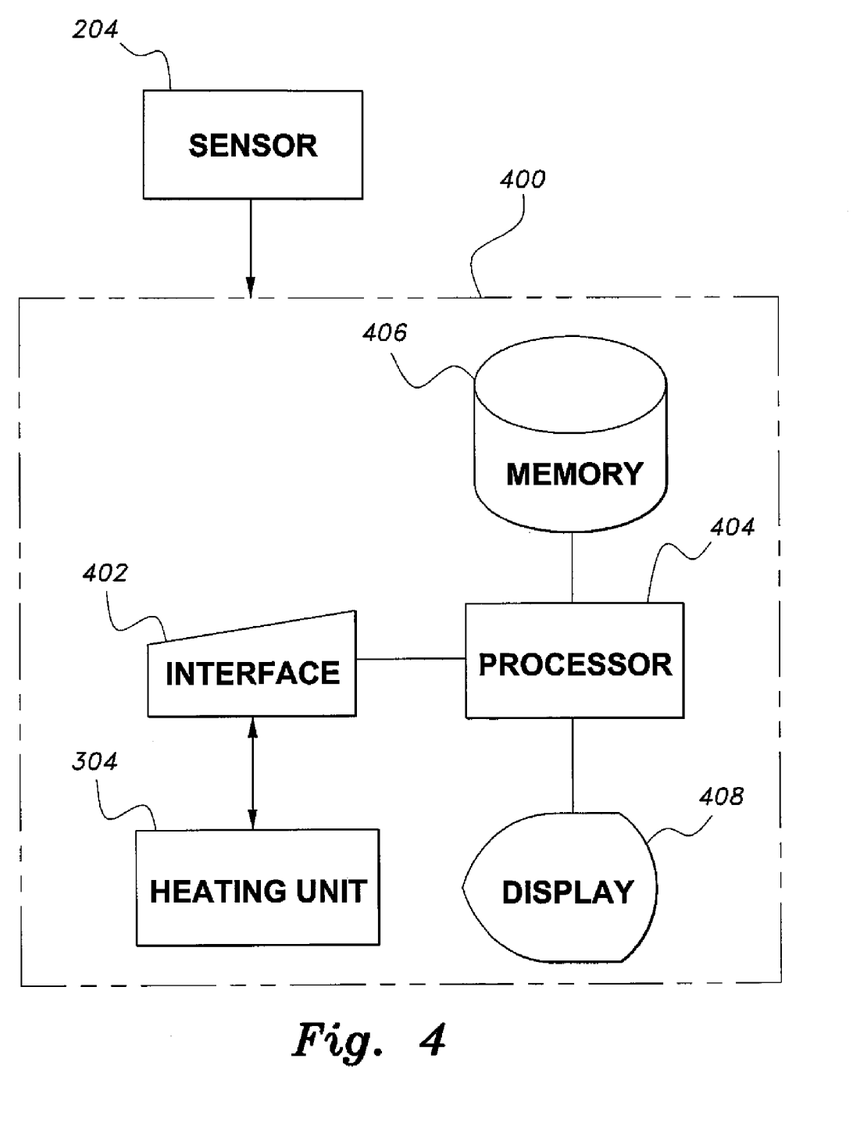
FIG. 4 is a block diagram of the electrical components of a two-piece electric coffee maker according to the present invention.

FIG. 4 is a block diagram of the electronics of the two-piece electric coffee maker. The coffee maker includes the sensor assembly, which includes at least a temperature sensor, and may also include a level sensor to determine whether there is enough water to make coffee. The control unit 400, which is housed in the stove base 300, includes an interface 402, a processor 404, a memory 406, and a display 408. The control unit 400 is connected to the ceramic heating unit 304 so that the heating unit 304 can be controlled by the control unit 400 either under control of the processor 404 or by operation of one of the interfaces 402.

The processor 404 may be a microprocessor, a microcontroller, a digital signal processor, an application specific integrated circuit, or any other programmable device or circuit used in conjunction with a crystal controlled timing circuit. The interface 402 may include the on/off button, the start button, various LED or incandescent light indicators, and an audio alarm circuit including a speaker or buzzer to sound an alert to indicate when to add the coffee grounds to the pot and to indicate when the coffee has finished brewing and is ready to drink. The memory 406 may be an EEPROM, read-only memory (ROM), random access memory (RAM), or any other memory readable by the processor 404 for storing the algorithm to be executed by the processor and the data read by the sensors. The display 408 is preferably a liquid crystal display (LCD) for alternately displaying time and temperature, although LED displays may be used, if desired. The processor 404 is connected to the heating unit 304 through a thermostat, temperature regulator or controller, or the like for regulating heat provided by the heating unit 304.

Figure 5:
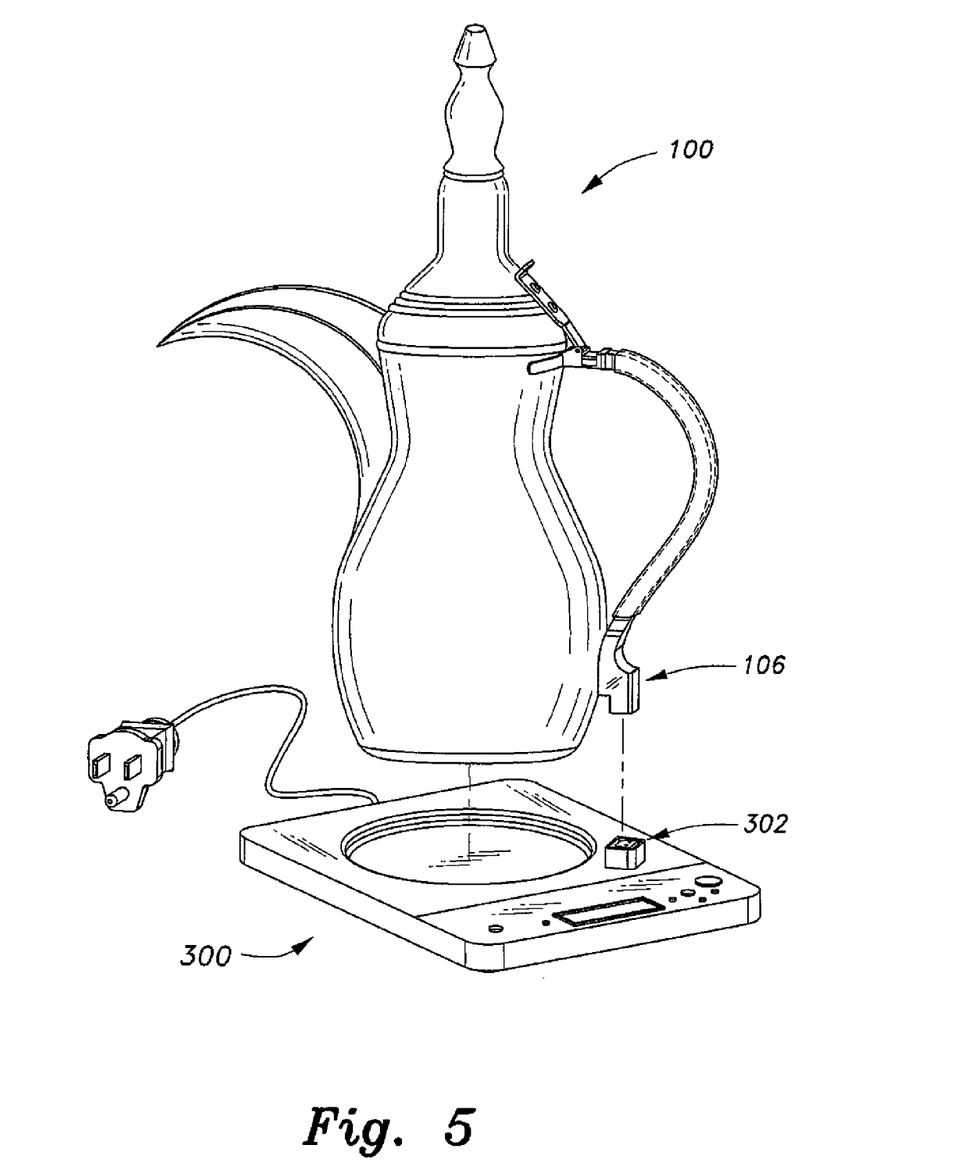
FIG. 5 is a perspective view of a two-piece electric coffee maker according to the present invention.

FIG. 5 is a perspective view of the two-piece coffee maker according to the present invention. As shown in FIG. 5, there is the coffee pot 100 of FIG. 1, the handle base with connector 106 of FIG. 1, and the stove base 300 and connector 302 of FIG. 3. FIG. 5 shows how the liquid container 100 would be attached to the stove base 300, including how the handle base connector 106 is configured to connect with the connector 302 on the stove base 300 to transmit and receive information regarding the liquid inside of the coffee pot 100.

Traditionally, Western-style coffee is made by boiling water and then allowing the water to seep or percolate through coffee grounds that are held in a perforated strainer or a filter basket so that the brewed coffee drips into the pot below the grounds. By contrast, Arabic coffee is made by boiling water in the Dallah, lowering the heat to a temperature below boiling, and adding the coffee grounds directly into the hot water in the Dallah to extract the coffee from the ground beans.

In use, the two-piece electric coffee maker helps to automate of control the process of making Arabic coffee. The Dallah 100 is filled with water and placed on the stove base 300, being sure to connect the mating connectors 106 and 302. The stove base 300 is turned on by pressing the on/off button 306, and the start button is pressed to turn on the ceramic hot plate 304 and bring the water to a boil. The temperature sensor 204 senses when the water has reached boiling temperature, and then the processor 404 controls the hot plate 304 to lower the temperature a few degrees below boiling. When the temperature sensor detects that the water has reached a suitable temperature, the Add grounds LED indicator 310 turns on and optionally an audible alert (a buzzer or beep) is emitted to signal that it is time to add the coffee grounds to the coffee pot 100. The water and grounds are permitted to simmer for a period of time sufficient to extract the coffee from the grounds. When the normal brewing time has expired, the processor 404 causes the Finish LED indicator 312 to illuminate and optionally an audible alert (a buzzer or beep) is emitted to signal that the coffee is now ready to drink. The processor 404 then lowers the temperature at the hot plate 304 to a temperature below simmering, but suitable for keeping the coffee warm. A Keep Warm button 320 is also supplied to warm chilled coffee to a suitable temperature, e.g., 85-91° C. The display 316 may periodically display time or temperature, the LED indicators 314, 322 signifying whether the numbers on the display 316 represent time or temperature. When the coffee is poured, the strainer 110 prevents the grounds or other sediment from being poured with the coffee, or reduces the quantity of such grounds or sediment.

It is to be understood that the present invention is not limited to the embodiments described above, but encompasses any and all embodiments within the scope of the following claims.

I claim:
1. A coffee maker, consisting of:
a pot having a closed base, an opened top, and a wall defined between the closed base and the opened top;
a lid hingedly mounted to the opened top of the pot;
a spout extending from the wall of the pot having a mouth;
a handle disposed on wall of the pot opposite the spout;
a strainer disposed within the pot, adjacent to the spout at an inlet of the spout, the pot having tracks disposed therein on opposite sides of the inlet to the spout, the strainer being a flat, perforated plate slidably received in the tracks; and having a handle extending from the flat plate;

a sensor assembly having at least a temperature sensor and a liquid level sensor disposed in the pot adjacent the base;

a first electrical connector extending downward from the handle, the first electrical connector and the sensor assembly being electrically coupled;

a stove housing including a ceramic hot plate mounted on the stove housing;

a second electrical connector mounted on the stove housing adjacent the ceramic hot plate, the second electrical connector facing upward, and being designed and configure for mating with the first electrical connector when the pot is placed on the ceramic hot plate;

a console mounted on the housing having a plurality of indicator lights and control buttons;

the control buttons include an On/Off button, a Start button, and a Keep Warm button;

the indicator lights include an LCD display connected to the control unit displaying temperature and time, a Finish indicator, and an Add light;

a control unit mounted in the housing of the stove base and coupled to the second electrical connector, the control buttons and indicator lights, the control unit comprises a memory module, and a processor selected from the group of microprocessor, microcontroller, and digital signal processor;

wherein the control unit receives the sensor assembly signals transmitted through the first and second electrical connectors, controls the ceramic hot plate to generate a predetermined amount of heat to the pot, and activates and deactivates the indicator lights on and off; and an annunciator connected to the control unit for emitting an audible alert for indicating when water in the pot has boiled, when the water in the pot has cooled to a predetermined temperature, when the liquid level falls below a predetermined threshold, and when a predetermined brewing time has been reached.

\* \* \* \* \*